United States Patent
Watanabe et al.

(10) Patent No.: US 10,920,754 B2
(45) Date of Patent: Feb. 16, 2021

(54) DEFORMABLE POLYMER FIBER ACTUATOR, SENSOR DEVICE AND CONTROL DEVICE

(71) Applicant: DENSO CORPORATION, Kariya (JP)

(72) Inventors: Haruhiko Watanabe, Kariya (JP); Eitaro Tanaka, Kariya (JP); Takuma Yamauchi, Kariya (JP); Goro Ueda, Kariya (JP)

(73) Assignee: DENSO CORPORATION, Kariya (JP)

( * ) Notice: Subject to any disclaimer, the term of this patent is extended or adjusted under 35 U.S.C. 154(b) by 97 days.

(21) Appl. No.: 16/320,468

(22) PCT Filed: May 23, 2017

(86) PCT No.: PCT/JP2017/019105
§ 371 (c)(1),
(2) Date: Jan. 24, 2019

(87) PCT Pub. No.: WO2018/020796
PCT Pub. Date: Feb. 1, 2018

(65) Prior Publication Data
US 2019/0267916 A1     Aug. 29, 2019

(30) Foreign Application Priority Data
Jul. 27, 2016   (JP) .................. 2016-147611

(51) Int. Cl.
*F03G 7/06* (2006.01)
*H02N 10/00* (2006.01)
*H02N 11/00* (2006.01)

(52) U.S. Cl.
CPC .............. *F03G 7/06* (2013.01); *H02N 10/00* (2013.01); *H02N 11/00* (2013.01)

(58) Field of Classification Search
CPC ........... F03G 7/06; F03G 7/065; H02N 10/00; H02N 11/00–008
See application file for complete search history.

(56) References Cited

U.S. PATENT DOCUMENTS 4,930,494 A * 6/1990 Takehana ........... A61B 1/00147
600/145
5,481,184 A * 1/1996 Jacobsen .............. B23K 15/002
257/E25.01

(Continued)

FOREIGN PATENT DOCUMENTS

JP    S61-142980 A   6/1986
JP    H07007975 A   1/1995

(Continued)

*Primary Examiner* — Laert Dounis
(74) *Attorney, Agent, or Firm* — Harness, Dickey & Pierce, P.L.C.

(57) ABSTRACT

An actuator that comprises a deformable material, an energy input part, and a characteristics change detection unit. The deformable material is configured with a polymer fiber and, by deforming in response to energy input from the outside, outputs motive power. The energy input part inputs energy to the deformable material. The characteristics change detection unit detects when the deformation characteristic of the deformable material has changed. The actuator also comprises a drive control unit that, by controlling the above-described energy, controls the output of the deformable material. When the characteristic change detection unit detects a change in the deformation characteristic, the drive control unit controls the energy in accordance with the change in the deformation characteristic.

13 Claims, 7 Drawing Sheets

(56) References Cited

U.S. PATENT DOCUMENTS

| | | | | |
|---|---|---|---|---|
| 5,685,149 A | * | 11/1997 | Schneider | F03G 7/06 250/573 |
| 5,744,947 A | | 4/1998 | Jacobsen et al. | |
| 8,434,303 B2 | * | 5/2013 | Honda | F03G 7/065 310/306 |
| 8,448,435 B2 | * | 5/2013 | Gregory | F03G 7/065 60/527 |
| 8,789,765 B2 | * | 7/2014 | Honda | G02B 7/08 236/101 E |
| 2007/0247101 A1 | * | 10/2007 | Noda | F03G 7/065 318/582 |
| 2008/0278590 A1 | * | 11/2008 | Tanimura | G03B 3/10 348/208.99 |
| 2015/0152852 A1 | | 6/2015 | Li et al. | |
| 2015/0219078 A1 | | 8/2015 | Li et al. | |

FOREIGN PATENT DOCUMENTS

| | | |
|---|---|---|
| JP | 2015533521 A | 11/2015 |
| JP | 2016042783 A | 3/2016 |

* cited by examiner

DEFORMABLE POLYMER FIBER ACTUATOR, SENSOR DEVICE AND CONTROL DEVICE

CROSS REFERENCE TO RELATED APPLICATIONS

This application is a U.S. National Phase Application under 35 U.S.C. 371 of International Application No. PCT/JP2017/019105 filed on May 23, 2017. This application is based on and claims the benefit of priority from Japanese Patent Application No. 2016-147611 filed on Jul. 27, 2016. The entire disclosures of all of the above applications are incorporated herein by reference.

TECHNICAL FIELD

The present disclosure relates to an actuator, which outputs motive power by deforming a deformable material in accordance with energy inputted from an outside device electrically, photonically, chemically, thermally, by absorption or by other means. The present disclosure further relates to a sensor device, which uses the actuator as a motive power source, and a control device, which controls the actuator.

BACKGROUND ART

As an actuator of this kind, a polymer fiber actuator is known conventionally as disclosed in, for example, patent literature 1. The polymer fiber actuator disclosed in patent literature 1 is a thermally driven type, which is capable of generating twisting or tension operation in accordance with temperature changes generated by electric heating or optical heating.

PRIOR ART LITERATURE

Patent Literature

Patent Literature 1: JP 2016-42783A

SUMMARY

The polymer fiber changes its material characteristic by absorbing water component or oil component and swelling. Because of this change in drive characteristic of the actuator, it sometimes becomes impossible to acquire desired actuator characteristics or causes breakage because of lowered strength. In this type of actuators other than the polymer fiber actuator, similar problems are likely to occur in case that a material (water component or oil component in polymer fiber actuator), which changes a deformation characteristic of a deformable material (polymer fiber in polymer fiber actuator), contacts the deformable material from an outside.

The present disclosure addresses the problem described above and has an object of providing an actuator, which uses deformation of a deformable material as a motive power source and properly suppresses a change in a drive characteristic caused by a change in a deformation characteristic of the deformable material. The present disclosure further has objects of providing a sensor device, which uses the actuator as the motive power source, and a control device, which controls the actuator.

For solving the problem described above, an actuator according to the present disclosure comprises a deformable material formed of a polymer fiber to deform and output motive power in accordance with energy input from an outside, an energy input device for inputting the energy to the deformable material, a characteristic change detection unit for detecting a change in the deformation characteristic of the deformable material, and a drive control unit for controlling the output of the deformable material by controlling the energy. The drive control unit controls the energy in accordance with the change in the deformation characteristic, when the characteristic change detection unit detects the change in the deformation characteristic.

Similarly, for solving the problem described above, a sensor device according to the present disclosure comprises a sensor unit for detecting outside information and the actuator capable of changing a posture of the sensor unit.

Further, for solving the problem described above, a control device is provided for controlling an actuator, which includes a deformable material formed of a polymer fiber to deform and output motive power in accordance with energy input from an outside and an energy input device for inputting energy to the deformable material. The control device comprises a characteristic change detection unit for detecting a change in the deformation characteristic of the deformable material and a drive control unit for controlling the output of the deformable material by controlling the energy. The drive control unit controls the energy in accordance with the change in the deformation characteristic, when the characteristic change detection unit detects the change in the deformation characteristic.

With those configurations, when the change in the deformation characteristic of the deformable material is detected, the actuator output is protected from being affected by the change in the deformation characteristic of the deformable material by properly controlling the energy inputted to the deformable material. As a result, it is possible to properly suppress a change in a drive characteristic of the actuator caused by the change in the deformation characteristic of the deformable material.

According to the present disclosure, it is possible to provide an actuator, which properly suppresses a change in a drive characteristic caused by a change in a deformation characteristic of a deformable material in the actuator using the deformation of the deformable material as a motive power source. It is also possible to provide a sensor device, which uses the actuator as the motive power source, and a control device, which controls the actuator.

EMBODIMENT

Figure 1:
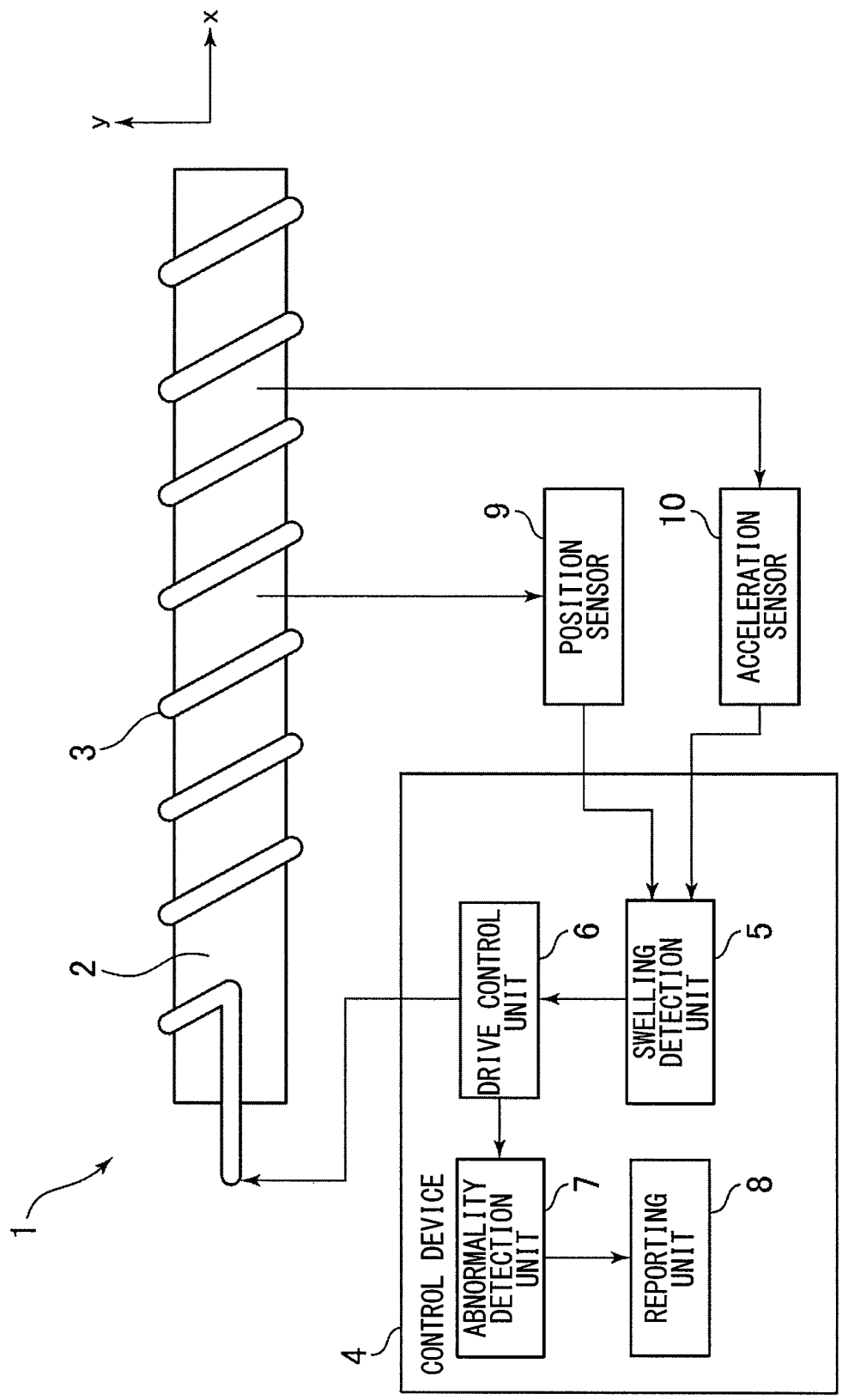
FIG. 1 is a diagrammatic view showing a general configuration of a polymer fiber actuator as one example of an actuator according to a first embodiment of the present disclosure.

Embodiments will be described below with reference to accompanying drawings. For easy understanding of the description, same structural components are designated with same reference numerals throughout the drawings thereby to simplify the duplicated description.

An actuator, which is a subject of the present disclosure, is an actuator for outputting motive power by deforming a deformable material in accordance with energy input electrically (e.g., current change), photonically (e.g., strength of irradiated light), chemically (e.g., reversible chemical reaction), thermally (e.g., temperature change), absorption (contraction by water absorption) or by other means. Such an actuator includes, for example, a polymer actuator, a shape-memory alloy, a piezoelectric element and the like. In the following embodiments, a polymer fiber actuator will be described as one example.

First Embodiment

Figure 2:
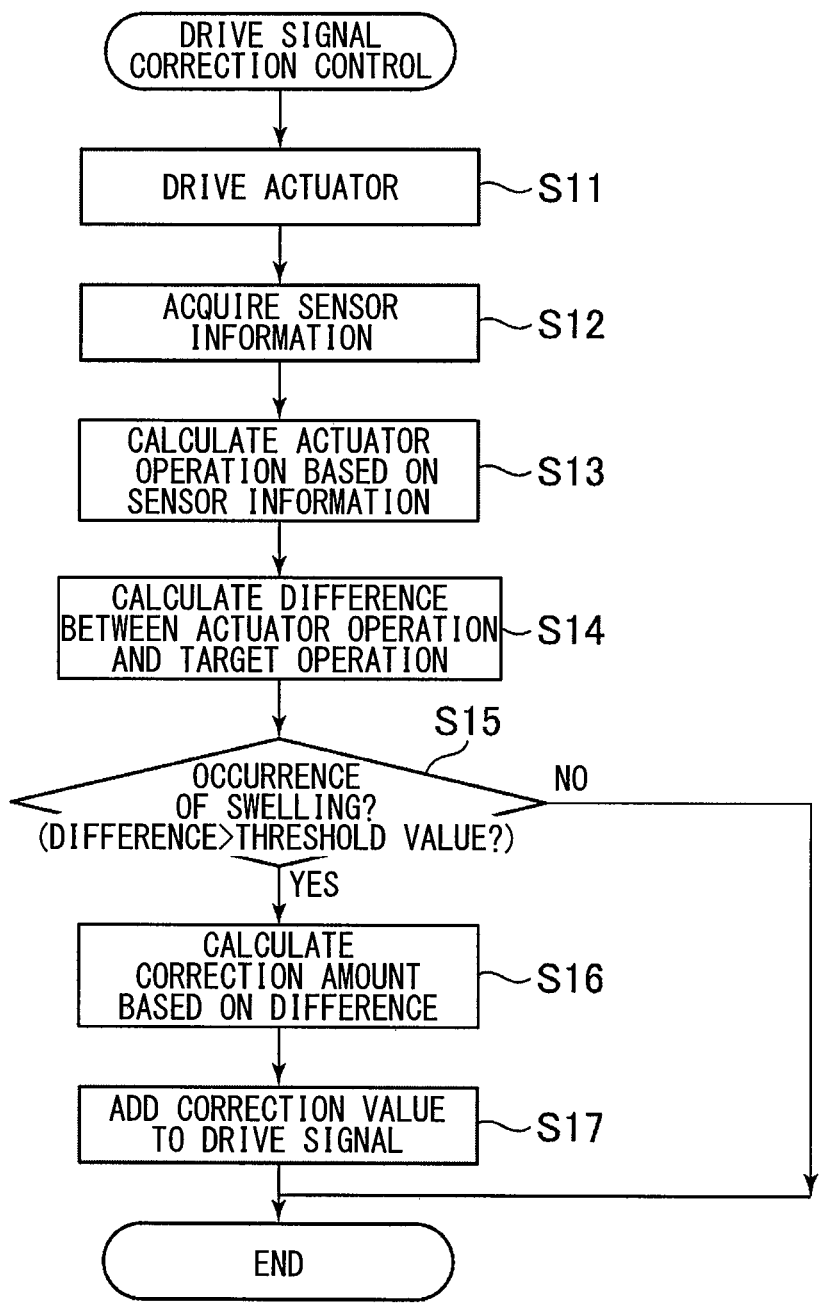
FIG. 2 is a flowchart of drive signal correction control executed by the polymer fiber actuator according to the first embodiment.

A first embodiment will be described with reference to FIG. 1 to FIG. 3. Referring first to FIG. 1, a configuration of a polymer fiber actuator 1 according to the first embodiment will be described.

The polymer fiber actuator 1 (actuator) according to the first embodiment is formed in a string shape extending in a predetermined axial direction as shown in FIG. 1 and has an axial cross section of a generally circular shape. The polymer fiber actuator 1 is capable of outputting motive power as an expansion/contraction operation in the axial direction or a twist operation about an axis in accordance with energy input, which is a temperature rise by heating. In the following description, as shown in FIG. 1, a direction of expansion (axial direction) of the polymer fiber actuator 1 is indicated as an X direction and a predetermined one direction (up-down direction in FIG. 1) among radial directions of a cross section, which is perpendicular to the X direction, is indicated as a Y direction.

As shown in FIG. 1, the polymer fiber actuator 1 includes a polymer fiber 2 (deformable material), a heating wire 3 (energy input part and electrically conductive material) and a control device 4.

The polymer fiber 2 is a motive power source of the polymer fiber actuator 1 and function as a deformable material, which outputs motive power by deforming in accordance with energy input (temperature rise by heating) from an outside. The polymer fiber 2 is formed of a bundle of polyamide fibers, which are arranged to extend in the X direction, for example.

The heating wire 4 is wound spirally about an outer peripheral side of the polymer fiber 2. The heating wire 3 generates heat with current supply and heats the polymer fiber 2. That is, the heating wire 3 functions as an energy input device for performing energy input, which is a temperature rise by heating. The polymer fiber 2 is capable of performing an expansion/contraction operation in the X direction and a twist operation about the X direction by deforming in accordance with heat inputted from the heating wire 3.

The control device 4 controls deformation of the polymer fiber 2, that is, output of the polymer fiber actuator 1, by controlling the current supply to the heating wire 3.

As described above, the polymer fiber 2 has a characteristic of changing a physical property by swelling as a result of absorbing water component or oil component in a surrounding environment. With a change in the physical property, a deformation characteristic of the polymer fiber 2 changes. That is, the amount of deformation of the polymer fiber 2 varies differently even in case of a temperature rise of the same condition and hence a driving characteristic of the actuator tends to change correspondingly. For this reason, in the first embodiment, the control device 4 corrects a drive signal (current supply amount) transmitted to the heating wire 3 from the control device 4 in accordance with a change in a deformation characteristic of the polymer fiber 2 caused by swelling so that such a change in the drive characteristic arising from the swelling of the polymer fiber 2 is prevented. To be in more detail, the control device 4 corrects the drive signal corresponding to a target output of the polymer fiber 2 by feedback-controlling the output generated by deformation of the polymer fiber 2. The control device 4 includes, as shown in FIG. 1, a swelling detection unit 5 (characteristic change detection unit), a drive control unit 6, an abnormality detection unit 7 and a reporting unit 8.

The swelling detection unit 5 detects an occurrence of swelling (change in deformation characteristic) of the polymer fiber 2. The swelling detection unit 5 is capable of estimating presence/absence of occurrence of the swelling based on various information related to a surrounding environment and the polymer fiber 2. However, in the first embodiment, the swelling detection unit 5 detects the occurrence of swelling based on an actual output relative to a target output in controlling driving the polymer fiber 2. The swelling detection unit 5 is electrically connected to, for example, a position sensor 9 for detecting a displacement amount of the polymer fiber 2 and an acceleration sensor 10 for detecting an acceleration in an operation of the polymer fiber 2. The swelling detection unit 5 grasps an actual output of the fibers based on information inputted from those sensors 9 and 10.

The drive control unit 6 controls the output of the polymer fiber 2 by controlling energy (heat) inputted from the heating wire 3 to the polymer fiber 2. In the first embodiment, in particular, the drive control unit 6 controls thermal energy inputted from the heating wire 3 to the polymer fiber 2 in accordance with swelling when the swelling detection unit 5 detects the occurrence of swelling of the polymer fiber 2. Specifically, the drive control unit 6 corrects the drive signal corresponding to the target output of the polymer fiber 2 by feedback-controlling the output generated by the deformation of the polymer fiber 2.

An abnormality detection unit 7 detects an abnormality of the polymer fiber 2. The abnormality of the polymer fiber 2 detected by the abnormality detection unit 7 includes a certain abnormality related to the polymer fiber 2. For example, even when thermal energy inputted from the heating wire 3 to the polymer fiber 2 is controlled, the change in the deformation characteristic caused by swelling cannot be covered and the change in the drive characteristic of the actuator cannot be suppressed. When the abnormality of the polymer fiber 2 is detected, the abnormality detection unit 7 outputs its detection result to a reporting part 8 or stores information related to abnormality detection.

The reporting unit 8 reports the abnormality of the polymer fiber 2 detected by the abnormality detection unit 7. The reporting unit 8 is a display device such as a display panel, for example, and may be configured to report the information related to the abnormality to a user of the polymer fiber actuator 1 by displaying it.

The control device 4 is physically a microcomputer, which includes a CPU (Central Processing Unit), RAM (Random Access Memory), ROM (Read Only Memory) and the like. All or a part of each function of the control device 4 is realized by loading application programs stored in the ROM to the RAM and executing it by the CPU, which reads out and writes data in the RAM and the ROM. Further, in case that the polymer fiber actuator 1 is applied as a vehicle-mounted device, for example, a sensor device 20 (refer to FIG. 3) using the polymer fiber actuator 1 as a drive power source is mounted in a vehicle such as an automobile, the control device 4 may be mounted in a microcomputer (for example, ECU), which is an automotive vehicle component.

The polymer fiber actuator 1 described above performs the following operations, for example. That is, when the control device 4 controls the current supply to the heating wire 3 so that the polymer fiber actuator 1 outputs a desired operation, a current of a predetermined value flows to the heating wire 3 and the heating wire 3 generates heat. Heat generated by the heating wire 3 is transferred to the polymer fiber 2 on a surface of which the heating wire 3 is wound. When the heat transferred from the outer peripheral surface finally reaches a central part of the polymer fiber 2 and the temperature of its entirety rises, the polymer fiber 2 deforms in accordance with a temperature rise amount. As a result, the polymer fiber actuator 1 outputs the motive power in accordance with deformation of the polymer fiber 2.

Further, when a swelling detection unit 5 of the control device 4 detects an occurrence of swelling of the polymer fiber 2 during an actuator operation, the polymer fiber actuator 1 corrects the drive signal for the heating wire 3, which corresponds to an actuator target output, so that the drive control unit 6 covers the change in the deformation characteristic of the polymer fiber 2 caused by swelling. This correction is occasionally referred to as drive signal correction control below.

One example of detailed processing of the drive signal correction control will be described with reference to FIG. 2. A series of steps in a flowchart of the drive signal correction control shown in FIG. 2 is executed by the control device 4 at every predetermined interval, for example.

At step S11, the polymer fiber actuator 1 is driven by the drive control unit 6. For example, the drive control unit 6 sets a predetermined target operation (target orbit, target acceleration change and the like) and controls the output by deformation of the polymer fiber 2 by controlling the heating of the heating wire 3 in accordance with the drive signal corresponding to the target operation. After finishing the processing of step S11, step S12 is executed.

At step 12, information is acquired from the position sensor 9 and the acceleration sensor 10 by the swelling detection unit 5. In the midst of outputting of the operation of the polymer fiber 3 by the drive control unit 6, the swelling detection unit 5 acquires a deformation amount of the polymer fiber 2 (for example, expansion/contraction amount in X direction or twist amount about X direction) from the position sensor 9 and acquires information related to the acceleration in the operation of the polymer fiber 2 from the acceleration sensor 10. After finishing the processing of step S12, step S13 is executed.

At step S13, the actuator operation, that is, actual output of the polymer fiber actuator 1 caused by the deformation of the polymer fiber 2, is calculated by the swelling detection unit 5 based on the sensor information acquired at step S12. After finishing the processing of step S13, step S14 is executed.

At step S14, the difference between the actuator operation calculated at step S13 and the target operation is calculated by the swelling detection unit 5. After finishing the processing of step S14, step S15 is executed.

At step S15, it is checked by the swelling detection unit 5 whether swelling is generated in the polymer fiber 2 based on the difference between the actuator operation and the target operation calculated at step S14. The swelling detection unit 5 determines that the deformation characteristic of the polymer fiber 2 changes and the swelling is generated in the polymer fiber 2, when the difference exceeds a predetermined threshold value. The swelling detection unit 5 outputs a check result related to generation of swelling to the drive control unit 6. In case of a determination of step S15 that the swelling is present in the polymer fiber 2 (Yes at step S15), step S16 is executed. In case of an opposite determination (No at step S15), the control processing is finished.

At step S16, in accordance with the determination of step S15 that the swelling is present in the polymer fiber 2, a correction amount is calculated based on the difference between the actuator operation and the target operation calculated at step S14 by the drive control unit 6 so that an adverse effect caused by the swelling of the actuator swelling is suppressed. The drive control unit 6 may adjust the correction amount in accordance with the difference or set a predetermined correction amount. After finishing the processing of step S16, step S17 is executed.

At step S17, the correction mount calculated at step S16 is added to the drive signal at the drive control unit 6. In the subsequent actuator control, the drive control unit 6 controls the heating wire 3 by using the control signal, which is a sum of the drive signal corresponding to the target output of the polymer fiber 2 and the correction amount. After finishing the processing at step S17, the present control processing is finished.

Next, advantages of the polymer fiber actuator 1 according to the first embodiment will be described.

The polymer fiber actuator 1 according to the first embodiment is provided with the polymer fiber 2, the heating wire 3, the swelling detection unit 5 and the drive control unit 6. The polymer fiber 2 outputs, as the deformable material, the motive power by deforming in accordance with the energy input (temperature rise by heating) from the outside. The heating wire 3 inputs, as the energy input device, the energy (heat) to the polymer fiber 2. The swelling detection unit 5 of the control device 4 detects the change in the deformation characteristic of the polymer fiber 2 (more in detail, occurrence of swelling of the polymer fiber 2 by absorption of water component and oil component from the outside). The drive control unit 6 of the control device 4 controls the output of the polymer fiber 2 by controlling the heat of the heating wire 3. The drive control unit 6 controls the heat amount inputted into the polymer fiber 2 (hereinafter referred to as input heat amount) from the heating wire 3 in accordance with the change in the deformation characteristic (swelling) when the swelling detection unit 5 detects the occurrence of swelling of the polymer fiber 2.

As described above, the polymer fiber 2 has a characteristic of changing its physical property by swelling as a result of absorbing the water component and the oil component of the surrounding environment. With the change in the physical property, the deformation characteristic of the polymer fiber 2 changes. That is, the deformation amount of the polymer fiber 2 differs even with the temperature rise of the same condition. It is thus likely that the drive characteristic of the actuator also changes. In contrast, the polymer fiber actuator 1 according to the first embodiment is so configured as described above that the change in the deformation characteristic of the polymer fiber 2 does not affect the actuator output even in case of the occurrence of swelling of the polymer fiber 2 by properly controlling the heat amount inputted to the polymer fiber 2, when the occurrence of swelling of the polymer fiber 2 is detected. As a result, it is possible to properly suppress the change in the drive characteristic of the actuator, which arises from the change in the deformation characteristic of the polymer fiber 2.

Further, in the polymer fiber actuator 1 according to the first embodiment, the drive control unit 6 corrects the input heat amount, which corresponds to the target output of the polymer fiber 2, in accordance with the swelling of the polymer fiber 2 when the swelling detection unit 5 detects the occurrence of swelling of the polymer fiber 2. In more detail, the drive control unit 6 corrects the drive signal (that is, input heat amount) corresponding to the target output of the polymer fiber 2 by feedback-controlling the output of the polymer fiber 2.

With this configuration, it is possible to properly control the operation of the polymer fiber 2 so that the actual output of the polymer fiber 2 attains the target output by properly correcting the input to the polymer fiber 2, even under the state that the deformation characteristic of the fiber changes because of swelling.

Further, the polymer fiber actuator 1 according to the first embodiment is provided with the abnormality detection unit 7 for detecting the abnormality of the polymer fiber 2, which is hard to counter even when the input heat amount is controlled in accordance with the change in the deformation characteristic of the polymer fiber 2. With this configuration, the drive control unit 6 is enabled to recognize accurately a situation, which is not possible to suppress the change in the drive characteristic of the actuator even when the drive signal to the heating wire 3 is corrected and the input heat amount for the polymer fiber 2 is corrected in response to the occurrence of swelling.

Further, the polymer fiber actuator 1 according to the first embodiment is provided with the reporting unit 8 which reports the abnormality of the polymer fiber 2 detected by the abnormality detection unit 7. With this configuration, it is possible to report promptly the occurrence of abnormality in the polymer fiber 2 to users and managers of the actuator.

Further, in the polymer fiber actuator 1 according to the first embodiment, the heating wire 3 is wound spirally about the outer peripheral side of the polymer fiber 2 as the energy input part. With this configuration, it is possible to transfer efficiently the heat emitted from the heating wire 3 to the entirety of the polymer fiber 2.

Further, the control device 4 which is a structural component of the polymer fiber actuator 1 can provide by itself the similar operation and effect as the entire polymer fiber actuator 1 by properly controlling the polymer fiber 2 and the heating wire 3 by the swelling detection unit 5 and the drive control unit 6 and attaining the functions described above.

Next, an exemplary application of the polymer fiber actuator 1 according to the first embodiment will be described with reference to FIG. 3. As shown in FIG. 3, the polymer fiber actuator 1 is used as a drive power source of a sensor device 20. The sensor device 20 includes a sensor part 21 for detecting outside information (heat, temperature, light and the like) and the polymer fiber actuator 1 which is capable changing a posture of the sensor part 21.

Figure 3:
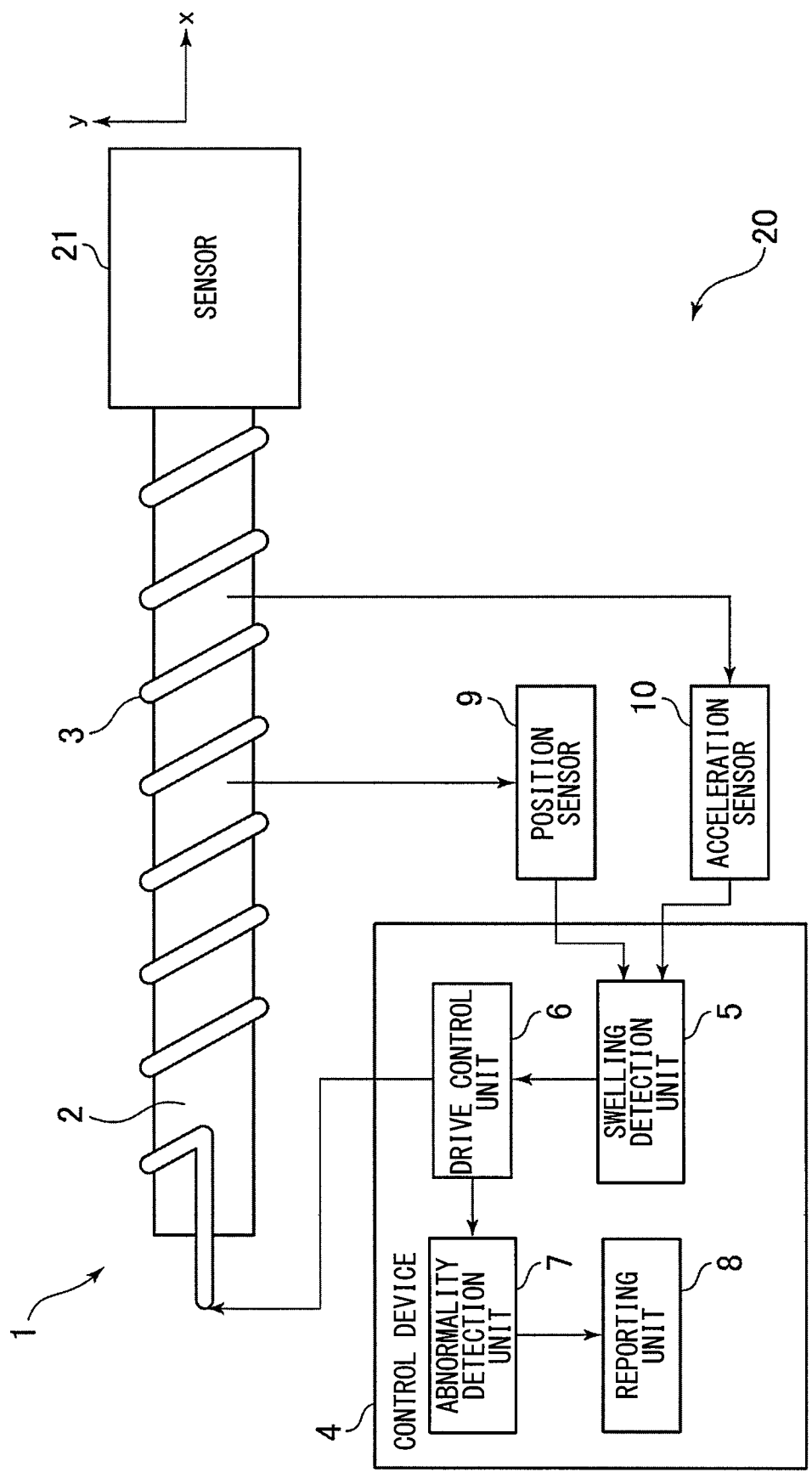
FIG. 3 is a diagrammatic view showing a configuration of a sensor device, to which the polymer fiber actuator according to the first embodiment is applied.

The sensor part 21 is connected to one end part of the polymer fiber actuator 1 as shown in FIG. 3, for example. The other end part of the polymer fiber actuator 1 is supported by a fixed member, for example, so that the end part to which the sensor part 21 is connected is configured to operate more remarkably.

The control device 4 controls the posture of the sensor part 21 by controlling the current supply to the heating wire 3 and thereby controlling the output of the polymer fiber actuator 1. The control device 4 may be configured to feedback-control the posture of the sensor part 21 by acquiring posture information of the sensor part 21 and regulating a control amount for the heating wire 3 in accordance with a difference from a target posture.

It is thus possible to reduce entire size and weight of the sensor device 20 by applying the polymer fiber actuator 1 as the drive source for the sensor device 20, since the motive power source can be sized small in comparison to a conventional device using a rotary machine such as a motor.

Second Embodiment

A second embodiment will be described with reference to FIG. 4 and FIG. 5. A polymer fiber actuator 1A according to the second embodiment is different from the actuator according to the first embodiment in a method of correction executed in accordance with the occurrence of swelling of the polymer fiber 2.

Figure 4:
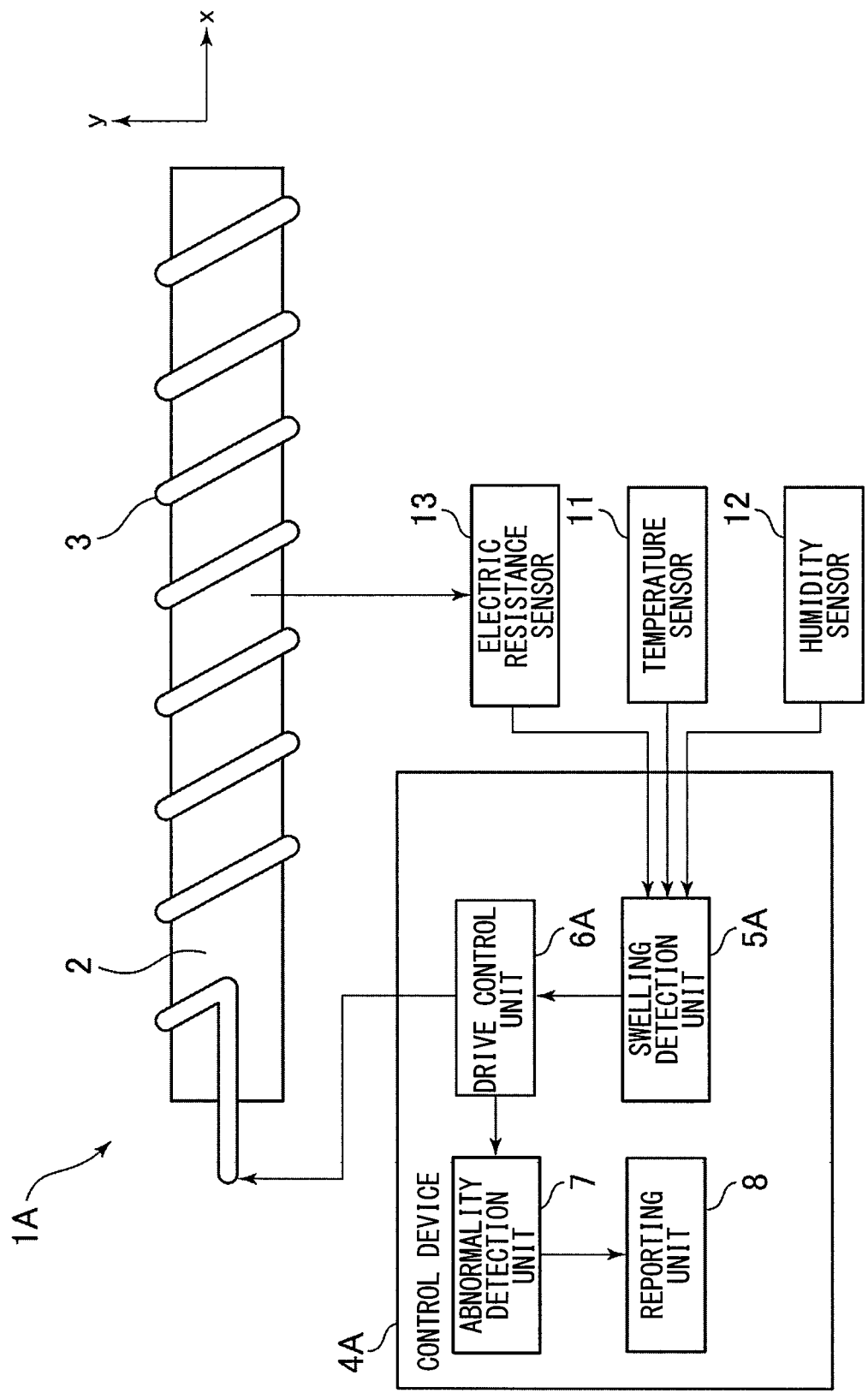
FIG. 4 is a diagrammatic view showing a general configuration of a polymer fiber actuator according to a second embodiment of the present disclosure.
Figure 5:
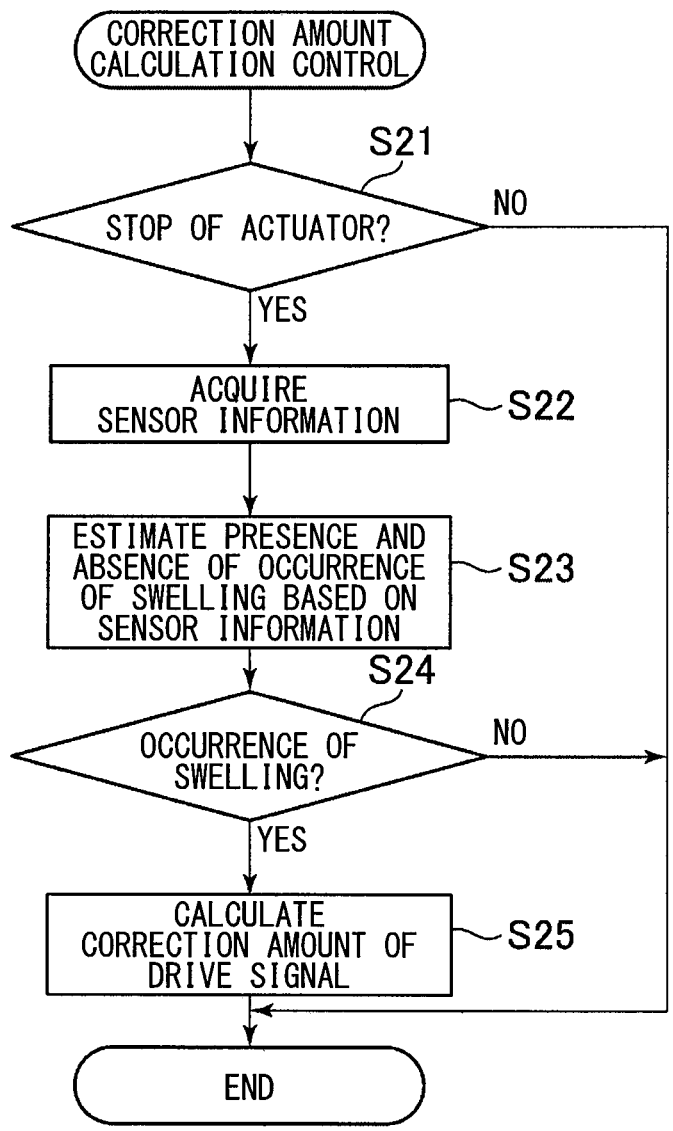
FIG. 5 is a flowchart of correction amount calculation control executed by the polymer fiber actuator according to the second embodiment.

As shown in FIG. 4, a drive control unit 6A provided in a control device 4A of the polymer fiber actuator 1A calculates a correction value in accordance with swelling of the polymer fiber 2 during a period of stopping the output of the polymer fiber 2 when a swelling detection unit 5A detects the occurrence of swelling of the polymer fiber 2 and corrects the drive signal and the input heat amount corresponding to the target output of the polymer fiber 2 by adding or subtracting the correction amount to or from the drive signal for the heating wire 3. In the following description, this correction is referred to as correction value calculation control.

Further, the swelling detection unit 5A provided in the control device 4A estimates the presence/absence of swelling of the polymer fiber 2 based on information such as temperature or humidity of the surrounding environment during the operation stop of the polymer fiber 2 and an electric resistance of the polymer fiber 2. The swelling detection unit 5A is electrically connected, as shown in FIG. 4, to a temperature sensor 11 for detecting a temperature of the surrounding environment, a humidity sensor 12 for detecting a humidity of the surrounding environment and an electric resistance sensor 13 for detecting an electric resistance of the polymer fiber 2 and estimates the presence/absence of swelling of the polymer fiber 2 based on information inputted from those sensors 11, 12 and 13.

One example of detailed processing of correction value calculation control in the second embodiment will be described with reference to FIG. 5. A series of steps in a flowchart of the correction amount calculation control shown in FIG. 5 is executed by the control device 4A at every predetermined interval.

At step S21, it is checked by the drive control unit 6A whether the polymer fiber actuator 1A is in a stop state. In case of a determination of step S21 that the polymer fiber actuator 1A is in the stop state (Yes at step S21), step S22 is executed. In case of an opposite determination (No at step S21), the control processing is finished.

At step S22, information is acquired from the temperature sensor 11, the humidity sensor 12 and the electric resistance sensor 13 by the swelling detection unit 5A. The swelling detection unit 5A acquires the information about the temperature and humidity of the surrounding environment from the temperature sensor 11 and the humidity sensor 12 during the period of stopping of the polymer fiber actuator 1A and acquires the electric resistance of the polymer fiber 2 from the electric resistance sensor 13. After finishing the processing of step S22, step 23 is executed.

At step S23, the presence/absence of swelling of the polymer fiber 2 is estimated by the swelling detection unit 5A based on the information acquired at step S22. The swelling detection unit 5A estimates the occurrence of swelling of the polymer fiber 2, for example, when rises of temperature and humidity of the surrounding environment exceed predetermined values and it is possible to determine that the water component and the like of the surrounding environment is more likely to infiltrate the polymer fiber 2. Further, the swelling detection unit 5A estimates the occurrence of swelling of the polymer fiber 2, when the electric resistance of the polymer fiber 2 varies in excess of a predetermined range and it is possible to determine that the physical property of the polymer fiber 2 is changing. After finishing step S23, step S24 is executed.

At step S24, it is checked by the drive control unit 6A whether the swelling of the polymer fiber 2 is present under a present state of the polymer fiber actuator 1A based on a swelling estimation result of step S23. In case of a determination result indicating the occurrence of swelling (Yes at step S24), step S25 is executed. In case of an opposite determination result indicating no occurrence of swelling (No at step S25), the present control processing is finished without execution of correction.

At step S25, the correction value for the drive signal is calculated by the drive control unit 6A to eliminate any influence of swelling on the actuator output in response to the determination of occurrence of swelling of the polymer fiber 2 at step S24. The drive control unit 6A can thus estimate, for example, a level of swelling at step S23 and regulate the correction amount in accordance with the level of swelling or set a predetermined correction amount. The drive control unit 6A controls the heating wire 3 by using a control signal, which is determined by adding the correction amount to the drive signal corresponding to the target output of the polymer fiber 2, in the subsequent actuator control. After finishing the processing of step S25, the present control processing is finished.

According to the polymer fiber actuator 1A according to the second embodiment, similarly to the polymer fiber actuator 1 according to the first embodiment, the actuator output is protected from being affected by the change in the deformation characteristic of the polymer fiber 2 even in case of the occurrence of swelling of the polymer fiber 2 by properly controlling the heat amount inputted to the polymer fiber 2 in response to the detection of occurrence of swelling of the polymer fiber 2. As a result, the polymer fiber actuator 1A according to the second embodiment provides the similar advantage of the polymer fiber actuator 1 according to the first embodiment.

Third Embodiment

A third embodiment will be described with reference to FIG. 6 and FIG. 7. A polymer fiber actuator 1B according to the third embodiment is different from the polymer fiber actuator 1 according to the first embodiment in that a countermeasure corresponding to the occurrence of swelling of the polymer fiber 2 is not the correction of the drive signal for the heating wire 3 but execution of restoration control for restoring the polymer fiber 2 to the original state.

Figure 6:
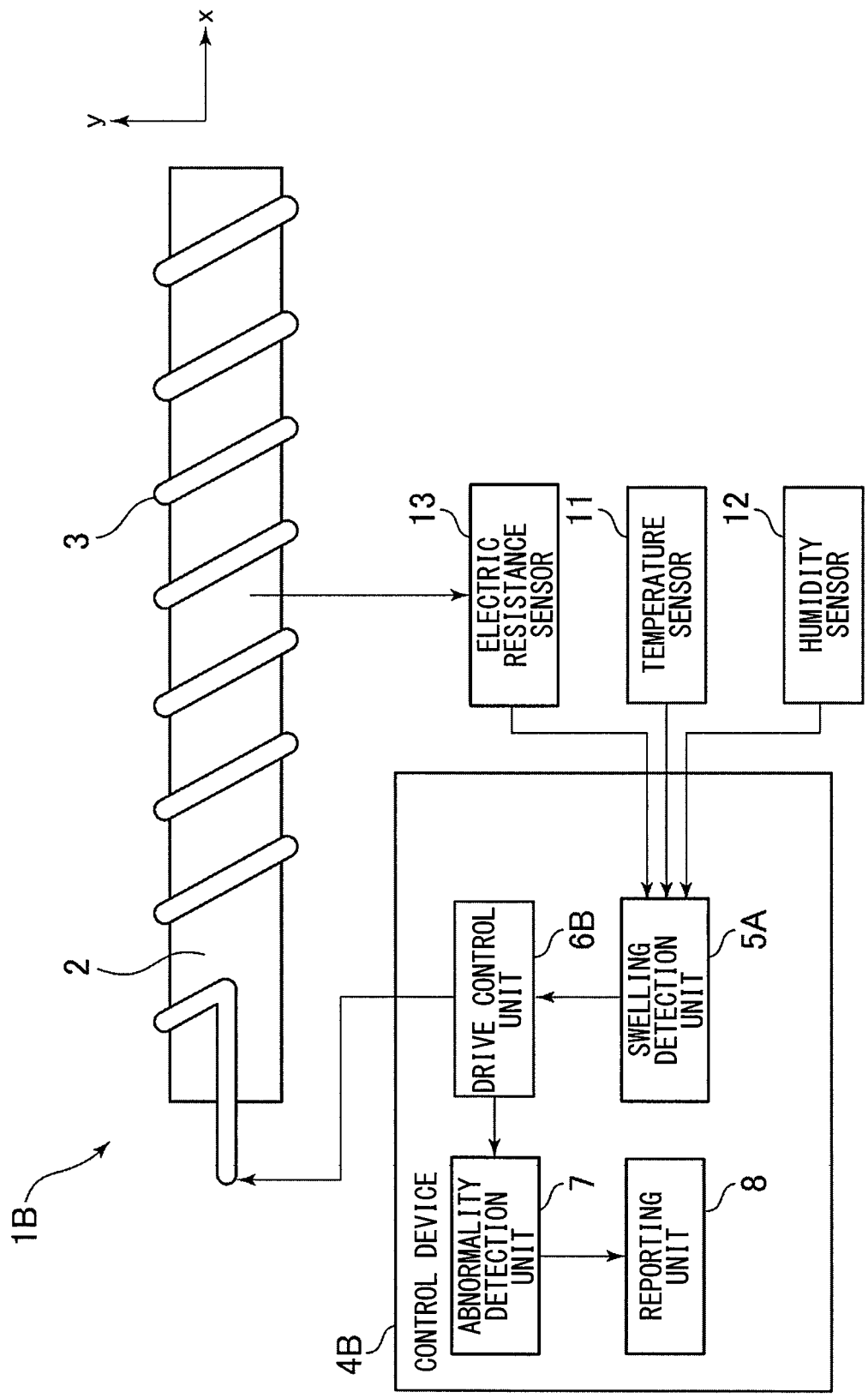
FIG. 6 is a diagrammatic view showing a general configuration of a polymer fiber actuator according to a third embodiment of the present disclosure.
Figure 7:
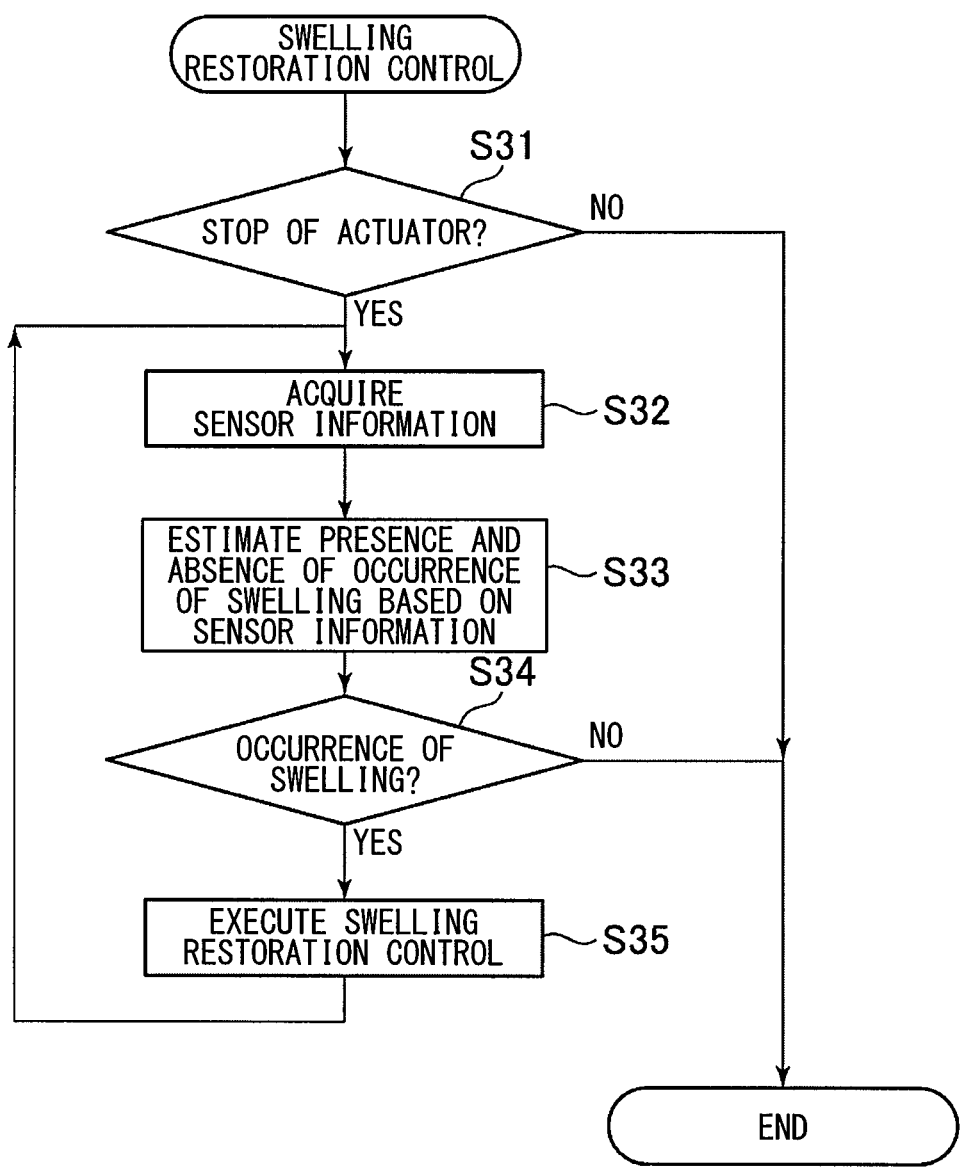
FIG. 7 is a flowchart of swelling restoration control executed by the polymer fiber actuator according to the third embodiment.

As shown in FIG. 6, a drive control part 6B provided in a control device 4B of the polymer fiber actuator 1B executes restoration control during stopping of the output of the polymer fiber 2 when the swelling detection unit 5A detects the occurrence of swelling of the polymer fiber 2. In the restoration control, by inputting a predetermined heat amount from the heating wire 3 to the polymer fiber 2, the drive control unit 6B causes the polymer fiber 2 to evaporate the water component and the like infiltrated into an inside of the polymer fiber 2 and restore its original state which is present before the occurrence of swelling of the polymer fiber 2. In the following description, this restoration control is referred to as swelling restoration control.

The swelling detection unit 5A provided in the control device 4B estimates, similarly to the swelling detection unit 5A according to the second embodiment, the occurrence of swelling of the polymer fiber 2 based on the information from the temperature sensor 11, the humidity sensor 12 and the electric resistance sensor 13.

One example of detailed processing of the swelling restoration control according to the third embodiment will be described with reference to FIG. 7. A series of steps in a flowchart of the correction amount calculation control shown in FIG. 7 is executed by the control device 4B at every predetermined interval.

Since contents of processing of steps S31 to S34 are similar to steps S21 to S24 of FIG. 5, respectively, no description will be made.

At step S35, the swelling restoration control is executed by the drive control unit 6B to eliminate any influence of swelling on the actuator output in response to a determination of the occurrence of swelling of the polymer fiber 2 at step S34. In the swelling restoration control, the drive control unit 6B outputs a drive signal of a predetermined value for the swelling restoration control for a predetermined period to the heating wire 3, for example, during the period of stopping of the polymer fiber 2, that is, when the drive signal for driving the polymer fiber actuator 1B is not present. The heating wire 3 generates a predetermined heat amount for the predetermined period in response to inputting of the drive signal. Thus, the polymer fiber 2 is heated with the predetermined heat amount for the predetermined period to emit at least a portion of the water component and the like and released from swelling. After finishing the processing of step S35, steps S32 to S35 are repeated until it is determined at step S34 that the swelling of the polymer fiber 2 is not present.

According to the polymer fiber actuator 1B according to the third embodiment, the swelling restoration control is executed properly by controlling the heat amount inputted to the polymer fiber 2 in response to the detection of the occurrence of swelling of the polymer fiber 2 so that, similarly to the polymer fiber actuator 1 according to the first embodiment, the actuator output is protected from being affected by the change in the deformation characteristic of the polymer fiber 2 even in case of the occurrence of swelling of the polymer fiber 2. As a result, the polymer fiber actuator 1B according to the third embodiment provides the similar advantage of the polymer fiber actuator 1 according to the first embodiment.

Further, according to the polymer fiber actuator 1B according to the third embodiment, the swelling restoration control is executed when the occurrence of swelling of the polymer fiber 2 is detected. As a result, it is possible to execute the actuator control by maintaining the deformation characteristic of the polymer fiber 2 always in generally the same state and improve control precision.

The embodiments of the present disclosure are described with reference to detailed examples. However, the present disclosure is not limited to those detailed examples. That is, any other examples resulting from design changes to the detailed examples described above are also included in the scope of the present disclosure as far as the feature of the present disclosure is provided. For example, each element provided in the detailed examples described above and its arrangement, material, condition, shape, size and the like are not limited to the examples but may be altered or modified. Further, each element provided in each embodiment described above may be combined as far as technically possible and such a combination is also included in the present disclosure as far as it has the feature of the present disclosure.

In the embodiments described above, the actuator according to the present disclosure is exemplified as the polymer fiber actuators 1, 1A and 1B. However, the actuator may be exemplified as other types of actuators as far as the deformation of the deformable material (polymer fibers 2 in the above-described embodiments) is used as the motive power source. In case of other types of actuators, the type of deformable material, the phenomenon of changing a deformation characteristic of a deformable material (swelling of the polymer fiber 2 in the embodiments described above), the type of substance for changing a deformation characteristic (water component and oil component in the embodiments described above) need be determined properly in correspondence to each actuator. For example, hydrogen is the substance for varying the deformation characteristic in case that the deformable material is a metal.

In the embodiments described above, the heating wire 3 is exemplified as the energy input device for inputting energy to the deformable material (polymer fibers 2). However, differently from the heating wire 3, the energy input device may be other electrically conductive materials. For example, an electrically conductive elastomer or plating may be wound about on an outer peripheral surface of the polymer fiber 2, which is the deformable material, to cover a portion or all of the outer surface of the polymer fiber 2.

According to the first embodiment described above, the swelling detection unit 5 of the control device 4 is exemplarily configured to acquire the information about the displacement and acceleration of the polymer fiber 2 from the position sensor 9 and the acceleration sensor 10 during the operation of the polymer fiber 2 and calculate the actual output of the polymer fiber 2 based on those sensor information. Without being limited to this configuration, the swelling detection unit 5 may be configured to use only one of the position sensor 9 and the acceleration sensor 10 or use any other information from which the actual output of the polymer fiber 2 is derivable.

According to the second and third embodiments described above, the swelling detection unit 5A of the control devices 4A and 4B is exemplarily configured to acquire the information about the temperature and humidity of the surrounding environment from the sensor 11 and the sensor 12 as well as the electric resistance value of the polymer fiber 2 from the electric resistance sensor 13 and estimate the presence/absence of swelling of the polymer fiber 2 based on those sensor information. However, without being limited to this configuration, the swelling detection unit 5A may be configured to use at least one of the temperature sensor 11, the humidity sensor 12 and the electric resistance sensor 13 or use any other information based on which it is possible to estimate the swelling of the polymer fiber 2.

Further, according to the embodiments described above, as one example control method for controlling the energy (heat amount) inputted from the energy input device (heating wire 3) to the polymer fiber 2 when the change in the deformation characteristic (occurrence of swelling) of the deformable material (polymer fiber 2), the drive signal correction control, the correction amount calculation control and the restoration control are exemplified according to the first embodiment, the second embodiment and the third embodiment, respectively. However, any other method may be used as far as it is possible to suppress the change in the drive characteristic of the actuator, which arises from the occurrence of swelling of the polymer fiber 2. It is also possible to combine any one of the drive signal correction control according to the first embodiment, the correction value calculation control according to the second embodiment and the swelling restoration control according to the third embodiment.

Further, according to the embodiments described above, the energy input device is exemplarily configured to use the electrically conductive material (electric heating wire 3) wound about the outer peripheral side of the polymer fiber 2, which is the deformable material. However, as far as it is possible to input energy to the deformable material, the energy input device may be configured such that an electrically conductive maternal is embedded in the polymer fiber 2 to heat the polymer fiber 2 from the inside, for example.

What is claimed is:

1. An actuator comprising:
    a deformable material formed of a polymer fiber to deform and output motive power in accordance with energy input from an outside;
    an energy input device for inputting energy to the deformable material;
    a characteristic change detection unit for detecting a change in a deformation characteristic of the deformable material; and
    a drive control unit for controlling the output of the deformable material by controlling the energy, wherein
    the drive control unit controls the energy in accordance with the change in the deformation characteristic, when the characteristic change detection unit detects the change in the deformation characteristic,
    the characteristic change detection unit detects a swelling of the polymer fiber by which a water component or an oil component is absorbed into the polymer fiber, and
    the driver control unit controls the energy, which is input from the energy input device to the deformable material, in accordance with the swelling, when the characteristic change detection unit detects the swelling.

2. The actuator according to claim 1, wherein:
    the drive control unit corrects the energy corresponding to a target output of the deformable material in accordance with the change in the deformation characteristic, when the characteristic change detection unit detects the change in the deformation characteristic.

3. The actuator according to claim 2, wherein:
    the drive control unit corrects the energy corresponding to the target output of the deformable material by feedback-controlling the output of the deformable material.

4. The actuator according to claim 2, wherein:
    the drive control unit corrects the energy corresponding to the target output of the deformable material by calculating a correction amount in accordance with the change in the deformation characteristic during stopping of the output of the deformable material and adding or subtracting the correction amount to or from the energy, when the characteristic change detection unit detects the change in the deformation characteristic.

5. The actuator according to claim 4, wherein:
the drive control unit executes restoration control for restoring the deformation characteristic to a state, which is present before the change, by inputting the energy from the energy input unit to the deformable material, when the characteristic change detection unit detects the change in the deformation characteristic.

6. The actuator according to claim 5, wherein:
the drive control unit inputs a predetermined heat amount in the restoration control from the energy input unit to the polymer fiber for evaporation of the water component infiltrated into the polymer fiber.

7. The actuator according to claim 1, further comprising:
an abnormality detection unit for detecting an abnormality of the deformable material, which is impossible to be removed by controlling the energy in accordance with the change in the deformable characteristic.

8. The actuator according to claim 7 further comprising:
a reporting device for reporting the abnormality detected by the abnormality detection unit.

9. The actuator according to claim 8, wherein:
the characteristic change detection unit detects the change in the deformation characteristic of the deformable material based on at least one of a deformation amount of the deformable material, a temperature or humidity of a surrounding environment and an electric resistance of the deformable material.

10. The actuator according to claim 1, wherein:
the energy input device is an electrically conductive material wound about an outer periphery of the polymer fiber; and
the polymer fiber is deformable in accordance with heat inputted from the electrically conductive material.

11. A sensor device comprising:
a sensor device for detecting outside information; and
the actuator according to claim 1 and capable of changing a posture of the sensor device.

12. A control device for controlling an actuator, which includes a deformable material formed of a polymer fiber to deform and output motive power in accordance with energy input from an outside and an energy input device for inputting energy to the deformable material, the control device comprising:
a characteristic change detection unit for detecting a change in the deformation characteristic of the deformable material; and
a drive control unit for controlling the output of the deformable material by controlling the energy, wherein
the drive control unit controls the energy in accordance with the change in the deformation characteristic, when the characteristic change detection unit detects the change in the deformation characteristic,
the characteristic change detection unit detects a swelling of the polymer fiber by which a water component or an oil component is absorbed into the polymer fiber; and
the drive control unit controls the energy, which is input from the energy input device to the deformable material, in accordance with the swelling, when the characteristic change detection unit detects the swelling.

13. An actuator comprising:
a deformable material formed of a polymer fiber to deform and output motive power in accordance with energy input from an outside;
an energy input device for inputting energy to the deformable material;
a characteristic change detection unit for detecting a change in a deformation characteristic of the deformable material; and
a drive control unit for controlling the output of the deformable material by controlling the energy, wherein
the drive control unit controls the energy in accordance with the change in the deformation characteristic, when the characteristic change detection unit detects the change in the deformation characteristic,
the drive control unit corrects the energy corresponding to the target output of the deformable material by calculating a correction amount in accordance with the change in the deformation characteristic during stopping of the output of the deformable material and adding or subtracting the correction amount to or from the energy, when the characteristic change detection unit detects the change in the deformation characteristic,
the drive control unit executes restoration control for restoring the deformation characteristic to a state, which is present before the change, by inputting the energy from the energy input unit to the deformable material, when the characteristic change detection unit detects the change in the deformation characteristic, and
the drive control unit inputs a predetermined heat amount in the restoration control from the energy input unit to the polymer fiber for evaporation of a water component infiltrated into the polymer fiber.

* * * * *